3,560,447
METHOD FOR FORMING ELASTOMERIC PARTICLES AND PARTICLES PRODUCED THEREBY
Wallace Karl Bingham, Woodbury Township, Washington County, Minn., assignor to Minnesota Mining and Manufacturing Company, St. Paul, Minn.
No Drawing. Continuation-in-part of application Ser. No. 377,114, June 22, 1964. This application Dec. 8, 1967, Ser. No. 688,956
Int. Cl. C08g 22/04, 53/02
U.S. Cl. 260—77.5
9 Claims

ABSTRACT OF THE DISCLOSURE

Substantially infusible and insoluble elastomeric particles between 3 and 120 microns in size are formed by shearing liquid precursor material in a liquid medium that provides conditions effective to convert the particles to the cured form; in a sepcific embodiment polyurethane particles are formed in an aqueous medium. One use for the particles is as a flatting agent in a paint composition.

This application is a continuation-in-part of a pending application, Ser. No. 377,114, filed June 22, 1964 and now abandoned.

BACKGROUND OF THE INVENTION

The art of forming minute particles of material is now fairly well developed. Minute spheroidal particles of thermoplastic material of meltable material are relatively conveniently formed according to prior art techniques by dropping finely-divided particles of the thermoplastic or meltable material through a heating stack and maintaining the particles in a free-falling state while surface tension forces cause spheroid formation. Bead or dispersion polymerization techniques, involving application of heat or ultraviolet light or the like to dispersed monomeric-type components to gain polymerized spheroids or droplets, are also well known.

The formation of minute particles of infusible elastomeric character, however, is not entirely satisfactorily accomplished on a mass production basis by heretofore known techniques, particularly when the particles to be formed are of polyurethane elastomeric character and the size of the particles is to be maintained below approximately 120 microns, preferably below 75 or even 40 or 50 microns in size, but larger than about 3 microns in size. Elastomeric particles of such size are especially desired for use in flat paints and as fillers in coatable mobile organic compositions (e.g., a binder resin and volatile organic liquid) analogous to paints.

SUMMARY OF THE INVENTION

Particles are formed according to the present invention by shearing liquid precursor material into particles between about 3 and 120 microns in size in a liquid medium that is immiscible with the precursor material and provides conditions effective to convert the precursor material in particulate form into a substantially infusible and insoluble elastomeric condition. The precursor material is generally sheared substantially immediately after introduction into the medium (as within one second) with a high-speed high-shear mixer immersed in the medium. Means are provided to maintain the integrity and separation of the particles in the medium, such means typically taking the form of an anticoagulant or emulsifying agent in the medium or in the precursor material. After shearing, the particles are subjected to the conditions provided by the liquid medium for a time sufficient to convert them into the substantially infusible and insoluble elastomeric condition.

In one example of this method to which the invention is particularly adapted, the precursor material is a polyurethane precursor and the liquid medium is a heated aqueous medium. It has been found that the polyurethane precursor material in particulate form will crosslink in the aqueous medium to a substantially infusible and insoluble elastomeric state. The procedure is an inexpensive way to form cured, tough, elastomeric, polyurethane particles.

DESCRIPTION

It can readily be determined whether a contemplated precursor material will be converted to a substantially infusible and insoluble condition when in particulate form in a specific liquid medium. One satisfactory method is to expose a small drop of the material (one millimeter in diameter, for example) in the liquid medium, where the drop should be converted to a substantially infusible and insoluble elastomeric condition, generally within a few minutes. A millimeter-sized drop of polyurethane precursor material exposed in a heated aqueous medium may foam somewhat as it is converted to the crosslinked polyurethane elastomer, but when divided into particles less than 120 microns in size, the precursor material does not foam and essentially nonporous cured particles result.

The polyurethane precursor material is typically based on polyisocyanate and either polyol, polyester, or polyether having reactive hydroxyl groups. The most uniform properties are obtained in the cured particles when the precursor material is a prereacted isocyanate-terminated prepolymer, and the use of such a prepolymer is preferred. Curing of the particulated polyurethane precursor in a liquid medium occurs rapidly even though a mass of the material can be stored dry almost indefinitely. The curing reactions in the particle are regarded as including water-reaction with the isocyanate groups of the precursor material, leading to chain-extension and crosslinking reactions which may involve formation of urea, biuret, and allophonate linkages. It should be noted that useful polyurethane particles can also be made from a polyurethane precursor material that includes a crosslinking agent and, for example, a urethane prepolymer, with the particles being formed either in an aqueous or a nonaqueous medium.

The rate at which the mixer should be operated to disperse the precursor material into particles between about 3 and 120 microns in size will generally vary with the viscosity of the precursor material and the kind and amount, if any, of an anticoagulant or emulsifying agent in the precursor material or liquid medium. By increasing the speed of the mixer, or lowering the viscosity, or increasing the amount of anticoagulant or emulsifying agent, or using an anticoagulant or emulsifying agent that is more effective, particle size can be reduced. A wide range of viscosities can be used, extending at least through the range of 10 to 250 poises (measured with a Brookfield viscometer). A viscosity less than 70–100 poises preferred since the process is then more easily controlled and a moderate energy-input is required in the mixer to obtain particles rather uniform in size. Viscosity may be reduced with volatile diluents, but they should comprise less than 20 weight percent of the precursor material.

The best control of the process and the best control of particle size distribution are obtained when the precursor material is extruded through a nozzle near (as within two inches) the mixing head. In this way, the precursor material is all fed directly to the mixing head and is uniformly subjected to the curing conditions of the bath for only a short time before being subdivided. The reduction of waste resulting from the control provided with this procedure makes it preferred in large-scale manufacturing. With most equipment, the precursor material is desirably extruded in a stream having a diameter less than about one-half inch.

In general, the particles of this invention are formed in two useful shapes—spheroidal particles, which are the most common, and highly irregularly shaped particles. Although the exact mechanism of formation of the irregular particles is not known, in general, irregular particles are formed by increasing the speed of curing of the precursor material. It will be understood that the precursor material passes through the mixer many times, a circular current being established in which material expelled from the mixer is drawn in again. It is theorized that the irregular particles occur when particles of precursor material not yet at the final small size, partially cure, the exterior portion of the particle, for example, being substantially converted to a condition of very low or no flowability, while the interior is substantially unconverted and flowable. When these particles travel again through the mixer, they are ruptured open and distorted into an irregular shape. (During rupture of the original particles, some particles smaller than three microns in size may be formed, but the bulk of the particles formed are above three microns in size.)

The ruptured, distorted elastomeric particles provide a highly efficient flatting agent in paints. When dispersed in many paint vehicles at a particle volume concentration (the volume percent that the particles comprise of the nonvolatile material of the paint) of about 25 percent, they surprisingly form a paint composition from which paint films may be coated that are as mark-resistant, glare-free, and optically flat as paint films coated from paint compositions using spheroidal particles in a particle volume concentration of 40 or 50 percent. The new particles appear to be more irregular than crushed silica particles or crushed rigid plastic particles and they approach the efficiency of the most efficient conventional flatting agents such as diatomaceous earth and pyrogenic silica. The following table compares the new and the conventional rigid particles with respect to efficiency in flatting. (Efficiency in flatting is indicated by particle volume concentration (PVC) required in a polyester-vinyl paint vehicle described in Example 3 to form a paint film that exhibits a 60° gloss of two.)

TABLE I

| Type of particle: | Approximate PVC in polyester-vinyl vehicle to achieve 60° gloss of two |
|---|---|
| Ruptured, distorted elastomeric particles of this invention (principally 3 to 7.5 microns) | 20.7 |
| Natural silica (5 to 25 microns) | 41.0 |
| Pyrogenic silica (0.015 to 0.02 microns) | 20.8 |
| Diatomaceous earth (less than 10 microns) | 22.0 |

The process of this invention will typically be practiced continuously, with additional liquid medium and precursor material being fed into the bath and an overflow outlet removing excess liquid medium together with finished particles. If the medium removed includes unfinished particles of precursor material, second and third baths containing mixers may be provided; then the overflow from the first bath is fed into the second bath and the particles subjected to further shearing and curing and so on into the third bath.

The invention is further illustrated in the following examples (parts and percents are in weight unless otherwise indicated):

Example 1

About 720 parts by weight of an isocyanate-terminated polyester prepolymer is heated to 140° F. in an oven, and into this is mixed about 42 parts by weight of rutile titanium dioxide pigment and about 2.64 parts of phthalocyanine green pigment. The isocyanate-terminated polyester prepolymer is one formed by reacting a 4,4' diphenyl methane diisocyanate with a polyester (i.e., the ester reaction product of a glycol and dicarboxylic acid). It is a waxy thermoplastic solid at room temperature and has an isocyanate equivalent weight of 627–667 (i.e., its gram molecular weight per isocyanate group is 627–667). Approximately 6.3 percent to 6.7 percent of its weight is accounted for by available isocyanate (NCO) groups.

The mixture of isocyanate prepolymer and pigment is then milled on a three-roll paint mill, the rolls of which are preheated to 200° F. Milling is continued until an intimate blend is obtained (i.e., a dispersion of 7+ Hegman reading on a fineness of grind gauge is preferred). The resulting mill base is maintained at a temperature of approximately 160° F., at which temperature its viscosity is about 1200 centipoises, and slowly extruded through a $\frac{1}{16}$-inch diameter orifice at a pressure of 30–35 p.s.i. into an aqueous medium maintained at about 195° F. (Even extrusion through a syringe needle has been used successfully.) About 300 parts by weight magnesium carbonate, suspended in about 5,676 parts by weight water, serves as the anticoagulant. Into this aqueous medium is extruded approximately 680 parts by weight of the mill base (remaining mill base was lost in the milling operation).

Immediately as the mill base exits from the extrusion orifice directly into the water, it is dispersed into a multitude of droplets or particles between about 5 and 75 microns in size by a high-speed high-shear mixer located within one inch of the extrusion orifice. A suitable high-speed high-shear mixing action is gained by use of a Barrington convertible jet mixer Model BJ–5B operating at approximately 6000 r.p.m. (the mixing head includes a multi-bladed stator and a multi-bladed rotor surrounded by a cylindrical casing through which the precursor is drawn). Extrusion requires approximately 20 minutes. After extrusion is completed, the mixer speed is allowed to drop to about one-third of the original speed; and temperature is allowed to drop to room temperature over a period of two hours. Further lowering of the speed of the mixer may be accomplished, but mixing is maintained for approximately 16 hours (i.e., during the entire time of curing). Then hydrochloric acid in the amount of about 10 percent in excess of the stoichiometric quantity for reaction with the magnesium carbonate (to convert it to soluble magnesium chloride) is added to the water, and polymerized polyurethane spheroids which are the product are separated from the liquid medium by filtration, washed with water and dried at about 140° F.

Contrary to suggestions in the prior art to the effect that water in contact with isocyanate causes foaming with curing to give a porous structure, the spheroids formed according to this illustration are dense and essentially free of pores in addition to being substantially infusible and insoluble (they resist softening until heated to about 500° F. or higher and are insoluble in most strong paint solvents). Essentially all of the spheroids formed as illustrated are within the size range of 5 to 75 microns, with at least 50 percent of the weight thereof below 40 microns, and the entire mass is useful. (A wider distribution of particle sizes, if desired, may be obtained by less vigorous high-speed high-shear mixing action upon extrusion; a narrower distribution below about 40 microns by more vigorous mixing.)

Example 2

About 766.6 parts by weight of the isocyanate-terminated polyester prepolymer described in Example 1 are blended with about 24.8 parts by weight of chrome oxide pigment and 33 parts by weight of phthalocyanine green pigment on a paint mill with the rolls maintained at about 200° F. Then the blend is cooled to about 150° F. and mixed with about 51 grams of 1–4 butanediol (a curing reactant for the prepolymer). This mixture exhibits a viscosity of about 1000 centipoises at 200° F. Immediately on compounding, it is extruded as described in Example 1 into a liquid medium of mineral spirits maintained at 140° F., with magnesium carbonate as an anticoagulant dispersed therein, and subjected to high-speed high-shear mixing. After about two hours, cured elastomeric spheroids within the size range of 3 to 120 microns in diameter are obtained, with 70 percent by weight less than 75 or 80 microns in diameter.

Example 3

A urethane prepolymer is first prepared from the following ingredients:

| | Parts |
|---|---|
| Poly-epsilon-caprolactone diol having a hydroxyl number of 90, a hydroxyl equivalent weight of 625, and a molecular weight of 1250 (Niax D–540) | 45.25 |
| Poly-epsilon-caprolactone diol having a hydroxyl number of 55, an acid number of .5, a hydroxyl equivalent weight of 1020, and a molecular weight of 2000 (Niax D–560) | 15.10 |
| Addition polymer of polyethylene oxide trimethylol propane having a molecular weight of 400 (Pluracol TP–440) | 3.02 |
| Cellosolve acetate | 5.02 |
| 4,4'-methylene bis(cyclohexyl isocayanate) having a molecular weight of 262.4 and an isocyanate equivalent weight of 131.2 (Nacconate H–12) | 30.15 |
| Dibutyl tin dilaurate (20 percent solids solution in xylol) | 1.02 |
| 2,4-dihydroxy benzophenone (Uvinul UV–400) ultraviolet light absorber | 1.00 |
| 2,6-di-tert-butyl-4 methyl phenol (Ionol) antioxidant | .50 |
| Methyl ethyl ketone | 1.50 |

The two caprolactone diols and the copolymer of polyethylene oxide and trimethylol propane were charged to a kettle and heated to 190° F. and the mixture refluxed under vacuum to remove moisture. The next three ingredients listed were then added in the order shown, with the isocyanate being added ⅛ part at a time at intervals sufficient to maintain a temperature of the ingredients between about 190 and 200° F. The whole mixture was then maintained at 190–200° F. for four hours, after which the last three ingredients listed above were separately mixed together and added to the mixture.

A slurry of magnesium oxide in water was then prepared using about one part of magnesium oxide in 120 parts of water. This slurry was placed in a 2½-gallon container and a Barrington (Model BJ–5B) mixer immersed in the container with the mixer head about one inch above the bottom surface of the container. While the slurry was heated to 110° F. and the mixer operated at full speed (7000 r.p.m.), the urethane prepolymer was poured slowly into the top of the slurry. The temperature of the slurry was raised to 170° F. over a period of ten minutes while maintaining high-speed agitation. The slurry was then siphoned into a separate vessel where it was held at 170° F. for four to six hours and subjected to mild agitation by a mixing paddle.

The particles were then filtered, the magnesium oxide neutralized with hydrochloric acid, and the acid removed by water washing. When observed under a microscope, the particles were highly irregular in shape. They had a size between about 1–12 microns, with the major portion of the particles being between 3 and 7.5 microns (the largest dimension of the particles as observed under the microscope is used as the size of the particles).

The particles were oven dried preparatory to being included in a paint vehicle having the following ingredients:

| | Parts |
|---|---|
| High-molecular-weight polyester formed from tere- and isophthalic acid, sebacic acid, and ethylene glycol (Vitel PE–207) | 6.94 |
| High-molecular-weight polyester that principally includes tere- and isophthalic acids and ethylene glycol (Vitel PE–200) | 1.74 |
| Terpolymer of vinyl chloride (91 weight percent), vinyl acetate (3 weight percent), and vinyl alcohol (6 weight percent) having an intrinsic viscosity of about 157 measured in cyclohexanone at 20° F. (Bakelite VAGH) | 1.74 |
| Liquid organo-tin-sulfur stabilizer for vinyl resin (Advastab TM–180) | .42 |
| A solution of petrolatum in xylol (50 weight percent solids) | 2.60 |
| Trans-1,2-bis(n-propylsulfonyl)ethylene mold inhibitor | .21 |
| Methyl ethyl ketone | 43.0 |
| Xylol | 8.70 |
| Cellosolve acetate | 34.65 |

These ingredients were simply mixed together to form the paint vehicle.

The particles were mixed into the vehicle using a Morehouse stone mill, with 16.4 parts of xylol and 4.06 parts of the particles being added to each 100 parts of the vehicle. The particle volume concentration of the resulting paint composition was 28.1. This paint composition was sprayed onto a vinyl sheet having a decorative wood-grain surface pattern. The uncoated wood-simulating sheet exhibits 85° and 60° gloss readings of about 22 and 10, respectively, but with the paint film of this invention covering it, the 85° and 60° gloss readings were 1.4 and 1.1, respectively. (Gloss readings were obtained on 85° and 60° glossmeters, Models 660S and 660A, respectively, made by the Photovolt Corp. of New York.)

Additional paint compositions were prepared by mixing the particles of this example into the above vehicle but at different particle volume concentrations. At a particle volume concentration of 20.7 percent, a paint film of the composition exhibited a 60° gloss of 2; at a particle volume concentration of 25.5, the 60° gloss reading was 1.5; at particle volume concentrations of 30, 32, and 34 percent, the 60° gloss reading was in each case about 1. The paint films from each of these compositions was clear and frost free.

Example 4

Eighty-two and five-tenths parts of the elastomeric particles of Example 3 werge dispersed in a paint vehicle containing 223.5 parts of a water dispersion (44–45 percent solids) of a polymer based upon ethyl acrylate (Rhoplex AC–22), 26.1 parts of surfactant and lubricant additives, 100 parts of water, and 35.0 parts of hydroxypropylmethyl cellulose having a viscosity of 4000 centipoises dissolved in water (2 percent solids). The particles were dispersed in the vehicle by Morehouse stone milling to give a paint composition having a particle volume concentration of 45 percent. When coated onto the wood-grain vinyl film, the paint composition formed a paint film having a 60° gloss of 1.8. Additional formulations were prepared using the paint vehicle and particles of this example but at particle volume concentrations of 25, 35, and 55 percent, with the 60° gloss reading of paint films of these compositions being 3.4, 2, and 1.6, respectively.

Example 5, which follows, illustrates the preparation of spheroidal particles from the aliphatic urethane prepolymer used in Examples 3 and 4 and also illustrates the use of a surfactant-type of emulsifying agent in the precursor material rather than an anticoagulant in the liquid medium. Use of an emulsifying agent has some advantages, since it eliminates the necessity of neutralizing the anticoagulant and washing away the products of the neutralizing reaction. Further, if urethane particles formed in a water bath using a surfactant are to be used in a water-based system, drying of particles is unnecessary. Instead, the particles are stored in a wet cake and ultimately dispersed into the water-based coating vehicle by simple mixing rather than by an expensive milling procedure.

Example 5

Four and five-tenths parts of polyoxyethylene sorbitan monolaurate surfactant (Tween 20 made by Atlas Chemical Industries) was mixed into 102.7 parts of the urethane prepolymer described in Example 3. This mixture was then poured slowly into a water bath heated to 110° F. in which the mixer described in Example 1 was immersed; the mixer was operating at about 3500 r.p.m. After 10 minutes, the temperature of the water was increased to 140° F. and held there for two hours while the mixer continued to operate. The water was then cooled to room temperature and the particle-containing bath allowed to stand overnight without agitation.

The product of this procedure was a mass of spheroidal particles, and when filtered and dried these particles measured 4–45 microns in diameter, with approximately 80 percent estimated to be between 7 and 27 microns in diameter. The spheroidal particles were tough and resilient, readily recovering their spheroidal shape when flattened severely with a microscope pick.

Example 6

Particles were made from a urethane prepolymer prepared from two moles of toluene diisocyanate and one mole of a hydroxy-terminated polyester which had been prepared from adipic acid, propylene glycol (10 mol percent), and ethylene glycol (90 mol percent); 6.0–6.3 percent of its weight was accounted for by available isocyanate groups. A mixture of 100 parts of this prepolymer and 19.7 parts of rutile titanium dioxide was milled on a three-roll mill, after which, 20 parts of toluene and 10 parts of polyoxyethylene sorbitan monolaurate surfactant were added to the mixture.

This mixture was then poured slowly into a water bath that was heated to 65° F. and continuously and rapidly agitated with a Waring blender operating at full speed. After the mixture had all been poured into the bath, the bath was heated to 130° F. and held at this temperature for four hours while maintaining mild agitation. The products of the process were spheroidal particles in an approximate size range of 5 to 80 microns in diameter with about 80 percent estimated to be between 12 and 65 microns.

I claim:

1. A method for forming substantially infusible and insoluble polyurethane elastomeric particles comprising (1) feeding a liquid isocyanate-terminated prepolymer to shearing means immersed in a heated aqueous liquid medium in which the prepolymer when in particulate form reacts with water to become converted to a crosslinked substantially infusible and insoluble elastomeric condition; (2) shearing the prepolymer into finely divided particles between about 3 and 120 microns in size immediately after the prepolymer is fed into the aqueous medium; (3) maintaining the integrity and separation of the particles in the aqueous medium until the particles are converted to the crosslinked substantially infusible and insoluble elastomeric condition, and (4) recovering the converted particles from the aqueous medium.

2. A method of claim 1 in which the isocyanate-terminated prepolymer is the reaction product of an isocyanate-terminated organic compound and an active-hydrogen-containing compound.

3. A method of claim 1 in which the prepolymer is fed through a nozzle immersed in the liquid medium, the prepolymer has a viscosity between 10 and 250 poises, and the outlet of the nozzle is less than one-half inch in diameter and is located less than two inches from a high-shear mixing head immersed in the liquid medium.

4. Substantially infusible and insoluble polyurethane elastomeric particles prepared by the method of claim 1.

5. A method for forming substantially infusible and insoluble polyurethane elastomeric particles comprising (1) feeding a liquid reactive precursor material that comprises a liquid isocyanate-terminated prepolymer and a crosslinking agent to shearing means immersed in a heated aqueous liquid medium in which the precursor material when in particulate form reacts with water to become converted to a crosslinked substantially infusible and insoluble elastomeric condition; (2) shearing the precursor material into finely divided particles between about 3 and 120 microns in size immediately after the precursor material is fed into the aqueous medium; (3) maintaining the integrity and separation of the particles in the aqueous medium until the particles are converted to the crosslinked substantially infusible and insoluble elastomeric condition, and (4) recovering the converted particles from the aqueous medium.

6. A method of claim 5 in which the precursor material is fed through a nozzle immersed in the liquid medium, the precursor material has a viscosity between 10 and 250 poises, and the outlet of the nozzle is less than one-half inch in diameter and is located less than two inches from a high-shear mixing head immersed in the liquid medium.

7. A method for forming substantially infusible and insoluble polyurethane elastomeric particles comprising (1) feeding a liquid reactive precursor material that comprises a mixture of a liquid isocyanate-terminated prepolymer and a crosslinking agent to shearing means immersed in an inert liquid medium in which the precursor material when in particulate form is converted to a crosslinked substantially infusible and insoluble elastomeric condition; (2) shearing the liquid reactive precursor material into finely divided particles between about 3 and 120 microns in size; (3) maintaining the integrity and separation of the particles in the liquid medium until the particles are converted to the crosslinked substantially infusible and insoluble elastomeric condition; and (4) recovering the converted particles from the liquid medium.

8. A method of claim 7 in which the precursor material is fed through a nozzle immersed in the liquid medium, the precursor material has a viscosity between 10 and 250 poises, and the outlet of the nozzle is less than one-half inch in diameter and is located less than two inches from a high-shear mixing head immersed in the liquid medium.

9. A method for forming substantially infusible and insoluble ruptured and distorted polyurethane elastomeric particles comprising (1) feeding a liquid isocyanate-terminated prepolymer to shearing means immersed in a heated aqueous liquid medium in which the prepolymer when in particulate form reacts with water to become converted to a crosslinked substantially infusible and insoluble elastomeric condition; (2) shearing the prepolymer into finely divided particles between about 3 and 120 microns in size immediately after the prepolymer is fed into the aqueous medium; (3) maintaining the integrity and separation of the particles in the aqueous medium until the particles are partially converted to the crosslinked substantially infusible and insoluble elastomeric condition; (4) resheating the partially converted particles; (5) maintaining the integrity and separation of the particles in the liquid medium until the resheared particles are fully converted to the crosslinked substantially infusible and insoluble condition; and (6) recovering the fully converted particles from the liquid medium.

References Cited
UNITED STATES PATENTS

| | | | |
|---|---|---|---|
| 2,968,575 | 1/1961 | Mallonee | 106—287 |
| 3,213,049 | 10/1965 | Heiss | 260—29.2 |
| 3,236,812 | 2/1966 | McElroy | 260—75 |
| 3,402,149 | 9/1968 | Walters | 260—75 |
| 3,420,796 | 1/1969 | Matsubayashi et al. | 260—47 |

DONALD E. CZAJA, Primary Examiner

H. S. COCKERAM, Assistant Examiner

U.S. Cl. X.R.

260—13, 29.2, 75, 859